US010282746B2

(12) United States Patent
Kirkby et al.

(10) Patent No.: US 10,282,746 B2
(45) Date of Patent: May 7, 2019

(54) MARKETING CAMPAIGN MANAGEMENT SYSTEM

(71) Applicant: Accenture Global Services Limited, Dublin (IE)

(72) Inventors: Stephen Denis Kirkby, Unley Park (AU); David Walter Skinner, Scottish Borders (GB); Robert Lawrence, London (GB); Warren Hutchinson, Surrey (GB)

(73) Assignee: ACCENTURE GLOBAL SERVICES LIMITED, Dublin (IE)

( * ) Notice: Subject to any disclaimer, the term of this patent is extended or adjusted under 35 U.S.C. 154(b) by 245 days.

(21) Appl. No.: 13/839,378

(22) Filed: Mar. 15, 2013

(65) Prior Publication Data
US 2014/0067521 A1 Mar. 6, 2014

Related U.S. Application Data

(60) Provisional application No. 61/695,899, filed on Aug. 31, 2012.

(51) Int. Cl.
*G06Q 30/02* (2012.01)
(52) U.S. Cl.
CPC ......... *G06Q 30/0243* (2013.01); *G06Q 30/02* (2013.01)
(58) Field of Classification Search
CPC .................................................. G06Q 30/0243
USPC ............................................ 705/14.4–14.73
See application file for complete search history.

(56) References Cited

U.S. PATENT DOCUMENTS

| 2010/0049538 | A1* | 2/2010 | Frazer | G06Q 30/02 705/14.4 |
| 2012/0005023 | A1 | 1/2012 | Graff | |
| 2012/0158487 | A1 | 6/2012 | Ogawa | |
| 2013/0021345 | A1* | 1/2013 | Hsiao | G06F 3/0484 345/440.2 |

FOREIGN PATENT DOCUMENTS

| CN | 101446982 | 6/2009 |
| CN | 102004982 | 4/2011 |

(Continued)

OTHER PUBLICATIONS

"Measuring marketing campaign performance", Published on Aug. 11, 2012 as per Wayback Machine, 6 pages.

(Continued)

*Primary Examiner* — Arthur Duran
*Assistant Examiner* — Derek Jessen
(74) *Attorney, Agent, or Firm* — Mannava & Kang, P.C.

(57) ABSTRACT

A campaign management system may include a data collection subsystem to collect and store data from different sources that may be related to different marketing channels. The system may also include a map generation subsystem to generate a marketing campaign map that includes a visual representation of performance of the marketing channels. A performance metric adjustment factor may be determined for one or more performance metrics to determine an actual value performance metric for each metric. The actual value performance metrics may be aggregated and compared to benchmarks to generate a visual representation of the entire campaign performance across the marketing channels.

15 Claims, 6 Drawing Sheets

(56) References Cited

FOREIGN PATENT DOCUMENTS

| | | |
|---|---|---|
| CN | 102073960 | 5/2011 |
| CN | 102254010 | 11/2011 |

OTHER PUBLICATIONS

"Patent Examination Report No. 1" on Australia Patent Application No. 2013222012, IP Australia, dated May 13, 2014, 4 pages.

\* cited by examiner

MARKETING CAMPAIGN MANAGEMENT SYSTEM

PRIORITY

The present application claims priority to U.S. provisional patent application Ser. No. 61/695,899 filed on Aug. 31, 2012 and entitled Campaign Management System.

BACKGROUND

Marketing analytics may attempt to determine the effectiveness of online advertisement campaigns. However, in most situations, companies or other entities trying to assess online marketing effectiveness rely on many different platforms to attempt to gain insights and understand their marketing performance. For example, a company may use a social media monitoring tool to gain insight for social media marketing, another tool to monitor and evaluate blogs, another tool to evaluate email campaigns, and so on. However, given all these tools, it is difficult to quantify marketing effectiveness simultaneously across all these different tools. Furthermore, it is difficult to simultaneously present the information from all the tools in a succinct and cohesive manner to quickly ascertain the current marketing effectiveness across many different marketing channels.

SUMMARY

According to an embodiment, a campaign management system includes a data collection subsystem to collect and store data from a plurality of different sources that may be related to a plurality of different marketing channels. The system also includes a map generation subsystem to generate a map that includes a visual representation of performance of the plurality of marketing channels. A performance metric adjustment factor may be determined for one or more performance metrics to determine an actual value performance metric for each metric. The actual value performance metrics may be aggregated and compared to benchmarks to generate a visual representation of the entire campaign performance across the plurality of data sources.

According to an embodiment, a method of generating a map may include receiving and storing data from the data sources, and determining performance metrics from the data. The method may include determining a performance metric adjustment factor for each of the metrics and calculating an actual value performance metric for each metric based on the performance metric adjustment factor and the corresponding performance metric. The method includes generating the map and including actual value performance metrics in the map for each node and benchmarking results for each node.

BRIEF DESCRIPTION OF DRAWINGS

The embodiments are described in detail in the following description with reference to the following figures. The figures illustrate examples of the embodiments.

DETAILED DESCRIPTION OF EMBODIMENTS

For simplicity and illustrative purposes, the embodiments of the invention are described by referring mainly to examples thereof. Also, numerous specific details are set forth in order to provide a thorough understanding of the embodiments. It will be apparent however, to one of ordinary skill in the art, that the embodiments may be practiced without limitation to one or more of these specific details. In some instances, well known methods and structures have not been described in detail so as not to unnecessarily obscure the description of the embodiments.

According to an embodiment, a campaign management system determines performance metrics across many different marketing channels to assess marketing effectiveness of a marketing campaign. A marketing campaign may include multiple marketing channels to distribute communications to people to promote a product or service. A marketing channel is a medium to distribute communications to people. Various performance metrics may be used to measure the effectiveness of a multichannel marketing campaign.

The campaign management system generates a visualization, referred to as a campaign management map or just map, that illustrates the performance of different marketing channels, such as web traffic, different social media applications and web sites, email, etc. The map also illustrates data to a target, such as the flow of online traffic to a target, such as a marketing landing page or a FACEBOOK page, or a TWITTER account, via multiple different marketing channels, and presents performance metrics for each channel and a final evaluation of whether marketing campaign benchmarks are being satisfied by each channel and overall. Different visual indicators, including color coding, size of nodes, etc., are utilized in the map to allow for quick assessment of performance. In one example, different components of the map may be presented in green if goals are being satisfied, but in other instances may be presented in amber or red if unsatisfactory. Also, performance metrics and thresholds may be determined to indicate the actual value or effectiveness for different marketing channels relative to each other and overall.

Data from many different sources for the different marketing channels may be continuously or periodically captured and stored over time. The map is updated in real-time or near real time to provide a snap shot of the current marketing effectiveness. Therefore, the map provides up-to-date illustration of a marketing campaign performance.

Figure 5:
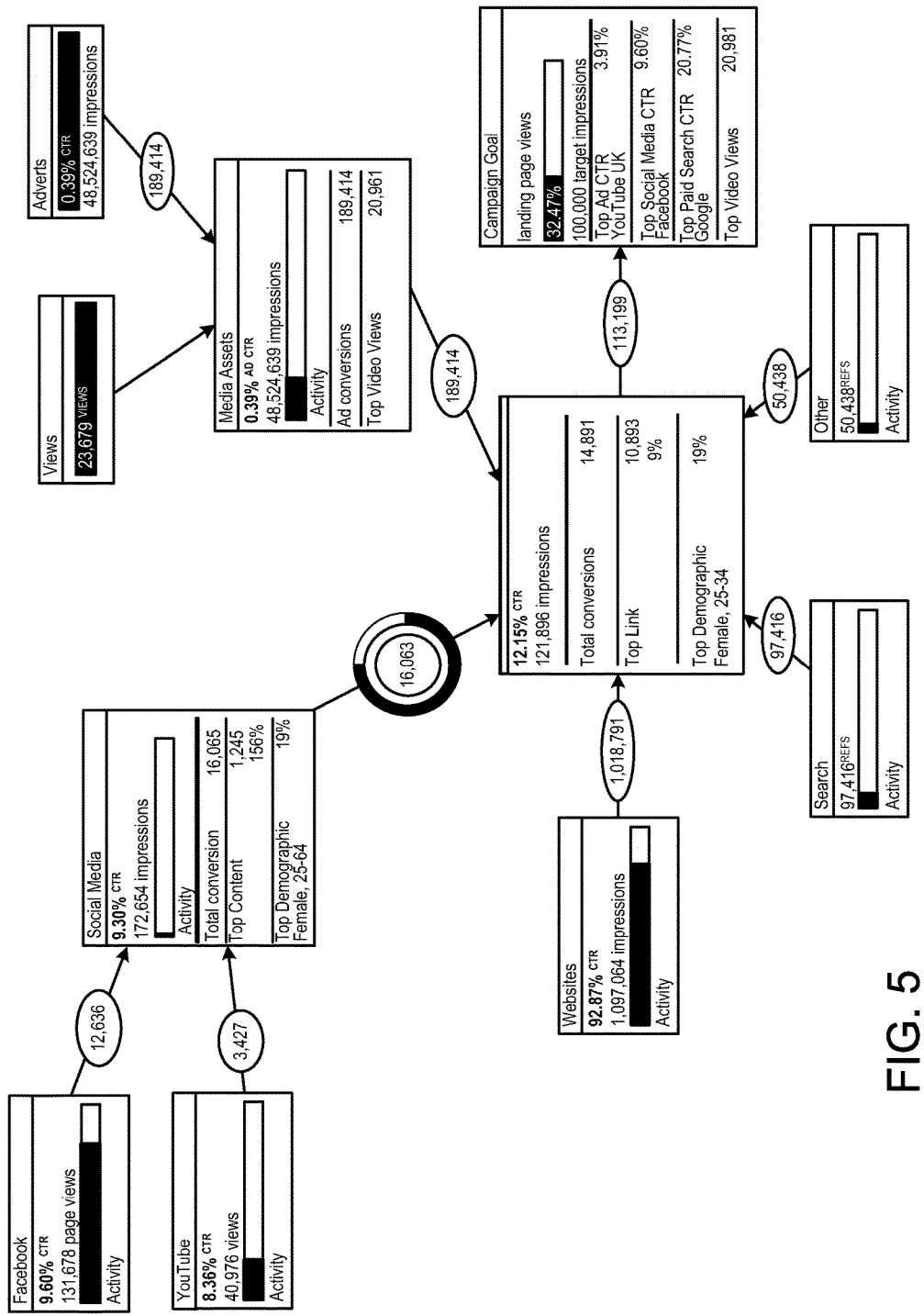
Figure 6:
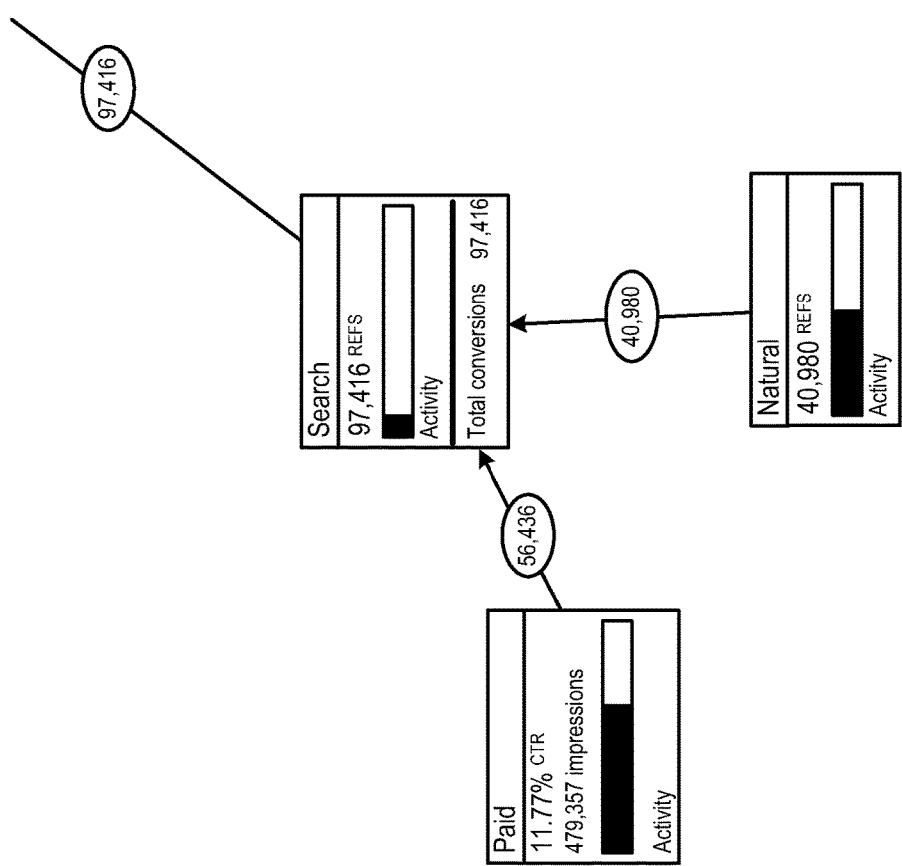

The map provides the ability to select altitude to obtain different views of the map. For example, a user via a user interface can zoom in or zoom out to obtain different views. The information density adjusts to the appropriate altitude so the user is not overwhelmed with data and the altitude can be adjusted by the user so the user interface remains uncluttered. For example, at a high altitude the user sees all the nodes and how they contribute to the goal. However when the user zooms in additional data about the nodes is displayed and the user can to scroll around the map to see other nodes. Each zoom in a zoom in or out view may provide more or less detail on performance metrics and nodes. For example, the map includes endpoints and other components that can be selected for drill down to get further details on performance, which is a zoom-in feature. Examples of drill downs are shown in FIGS. 5 and 6. The endpoint nodes represent the marketing channels providing marketing information for different marketing channels, and the target node represents a goal for a marketing campaign.

The nodes that can be selected for drill down and the information shown at different altitudes is customizable and enables a user to create a library of nodes to support a growing number of different data sources. In one embodiment, the initial configuration of the map (i.e., the data sources that it represents; how the nodes relate to each other; and the adjustment factors for the nodes) may be entered in an XML file. A graphical user interface may use the XML file to facilitate the configuration of the map so that it's easy for users to create their own maps with the data sources of their choice.

Also, the campaign management system may utilize an online testing system to test and evaluate scoring techniques and modifications to online marketing to improve performance. For example, the campaign management system may connect with an online experimentation platform. The data provided by the map can be fed into the online experiment system to enable automatic optimization of the web experience. This means that the user experience of the marketing site can be automatically adjusted to drive a desired outcome based on the current state of the marketing campaign.

The campaign management system and the map generated by the campaign management tool enables a campaign manager or other person to view their entire digital campaign on a single canvas and understand the net effectiveness of that campaign. The campaign manager can easily obtain the insight they need to improve their campaign effectiveness from the map. Some of the functions of the campaign management system and the map are to simplify visualization. For example, the results from all the endpoints (e.g., data sources/marketing channels) are shown on a single screen and visually represented in a consistent manner. The user interface (UI) is intentionally clean and simple, making the information easy to understand and interpret.

Another function is coherence. The results obtained from the various endpoints are translated into values that are directly comparable with each other. Each node on the map is configurable to ensure that it reports data in a format that is relevant to the marketing objective. There is no need for a manual correlation process.

The system and map provide a representation of a unified goal. The results from the various data sources are shown in a way that demonstrates their contribution to the desired end-goal, including analytic information depicted in business terms relating to the impact on the digital campaign. Moreover, the map shows how the various endpoints contribute to the unified marketing goal which is one example is a target number of impressions.

The campaign management system auto-updates the map. In one example, the system is provided as a cloud-based service and delivered via a standard HTML web browser. The system polls backend data sources on a regular basis for data updates and automatically reflects these on the map. This means that the map will provides a "point in time" view of campaign health.

The system provides campaign insight. As a result of the up-to-date and unified view, marketers can take early remedial action to adjust parts of the campaign that are not performing as desired.

Figure 1:
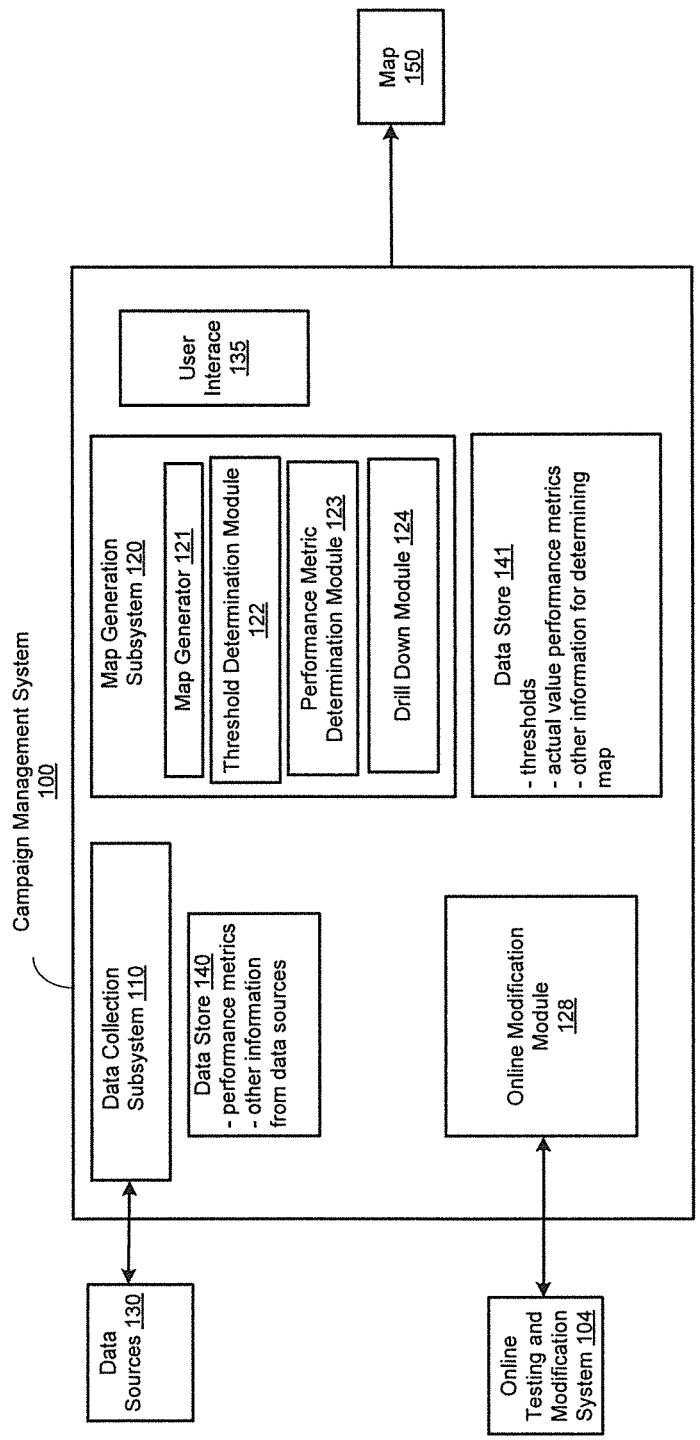
FIG. 1 illustrates a campaign management system.

FIG. 1 discloses a campaign management system 100, according to an embodiment. The system 100 includes a data collection subsystem 110 and a map generation subsystem 120. The data collection subsystem 110 receives information from data sources 130 that provide information about the marketing performance for different marketing channels and activities. The data sources 130 may provide information regarding different social media applications, such as FACEBOOK, TWITTER, etc., blogs, YOUTUBE, email, online ads, etc. Each source may provide information related to different performance metrics that are relevant to the particular source, such as click throughs, page views, re-tweets, comments, likes, references, etc. The data collection subsystem 110 may poll the data sources 130 for the information or may instruct the data sources 130 to push the information periodically. The information is stored in the data store 140. The data store 140 may comprise a database, an online analytical processing (OLAP) system or another type of data storage.

The map generation subsystem 120 may comprise a map generator 121, a threshold determination module 122, a performance metric determination module 123, and a drill down module 124. The map generation subsystem 120 may store and retrieve information from a data store 141. The information in the data store 141 may include thresholds, calculated metrics or any information used to generate and display a map 150, also referred to as a marketing campaign map.

The map generator 121 generates the map 150, which may be viewed through a user interface 135, which may be a graphical user interface. The user interface 135 may be presented through a web browser or through another application executed on a computer system. The map 150 includes nodes. Endpoint nodes represent the marketing channels and data for example from the different data sources or data source types for the marketing channels, such as social media, email, etc. The map includes a target node and shows the flow from the endpoints to the target node and performance metrics for each of the endpoints and the target node. The target node may represent a location where traffic is being driven, such as a microsite, company landing page, a promotional web page, etc. The target node may have an associated goal node that indicates whether the overall goals for the entire campaign are being met. The goal node calculates the overall performance based on the different performance metrics used by each endpoint. Color coding may be used to determine whether thresholds are met. In one embodiment, three thresholds are stored for each node, representing green, amber and red level effectiveness corresponding to the given node. Examples of the map are further described below.

The threshold determination module 122 determines the threshold for each node. The thresholds may be calculated by evaluating historical performance of different marketing channels and stored in the data store 141. In one example, each performance metric for the marketing channels has multiple thresholds. The thresholds may include thresholds to determine whether a performance metric is underperforming, potentially underperforming or is satisfactory. For example, a click through rate of less than 5% is underperforming; a click through rate of less than 10% is potentially underperforming; and a click through rate of greater than 10% is satisfactory. The performance metric for each marketing channel/endpoint node may be compared to the thresholds, or a total performance metric, such as total click through rate for multiple marketing channels may be compared to thresholds or a target goal, such as target number of impressions, may be compared to thresholds to determine whether a metric or goal is underperforming, potentially underperforming or is satisfactory. This information may be stored in the data store 141 and displayed in the map 150.

The performance metric determination module 123 determines the performance metrics for each node. Some performance metrics may be received from the data sources 130 and then actual value performance metrics may be calculated from the received performance metrics. The performance metric determination module 123 may retrieve performance metrics from the data store 140 and store them in the data store 141. The retrieved performance metrics may be values for performance metrics such as number of likes, click through rates, etc. Also, the performance metric determination module 123 may determine values for the performance metrics based on performance factors described below and store the values in the data store 141. The data store 141 may be a low-latency data store to allow the map 150 to be updated in real time. The low latency data store may comprise memory-based storage to allow for fast data access. According to an example, historical analysis of marketing data may determine that a YOUTUBE source is worth more than a FACEBOOK source. A factor is ascertained for each of the data sources 130 that indicates the relative worth of each source with respect to one another. The factors may include different weights for each source. These factors are used to calculate actual value performance metrics for each source and to determine whether the final goals are being met for marketing effectiveness. The performance metric determination module 123 may also determine a campaign goal for the target node and store metrics associated with the campaign goal, such as click through rate, impressions, etc. The metrics may include a total based on the data flow from one or more of the endpoint nodes.

The drill down module 124 allows a node to be clicked-on to display additional information about the node. The drill down module 124 may retrieve information for the drill down from the data store 140. In one example, the drill down module 124 receives a selection of a drill down for one of the endpoint nodes in the map 150, and determines the value for the performance metric for the endpoint node for which the drill down is selected. A value (e.g., a measured value) for the performance metric may be displayed adjacent to the selected endpoint node in the marketing campaign map 150 and a contribution of the selected endpoint node to a total for the target node may be displayed in the map 150.

The system 100 may also comprise an online modification module 128 that connects with an online testing and modification system 104 to evaluate scoring techniques and modifications to online marketing to improve performance. For example, the data provided by the map 150 can be fed into the online testing and modification system 104 to enable automatic optimization of the web experience for a particular user. This means that the user experience of the marketing site can be automatically adjusted to drive a desired outcome based on the current state of the marketing campaign.

Figure 2:
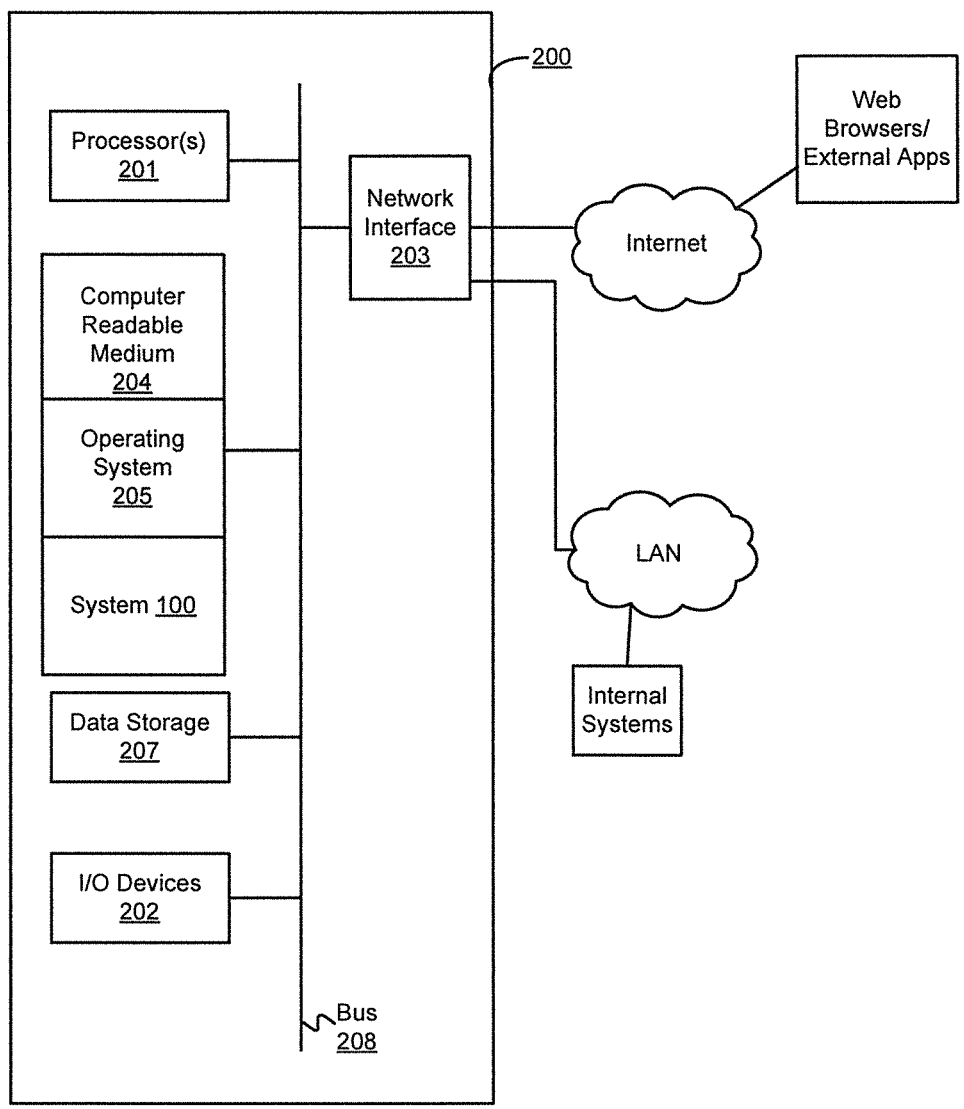
FIG. 2 illustrates a computer system that may be used for the methods and systems described herein.

FIG. 2 illustrates a computer system 200 that may be used to implement the system 100. The illustration of the computer system 200 is a generalized illustration and that the computer system 200 may include additional components and that some of the components described may be removed and/or modified. The computer system 200 may be a server. The system 100 may be implemented in a distributed computing system, such as a cloud computing system, on a plurality of servers.

The computer system 200 includes processor(s) 201, such as a central processing unit, ASIC or other type of processing circuit, input/output devices 202, such as a display, mouse keyboard, etc., a network interface 203, such as a Local Area Network (LAN), a wireless 802.11x LAN, a 3G or 4G mobile WAN or a WiMax WAN, and a computer-readable medium 204. Each of these components may be operatively coupled to a bus 208. The computer readable medium 204 may be any suitable medium which participates in providing instructions to the processor(s) 201 for execution. For example, the computer readable medium 204 may be non-transitory or non-volatile medium, such as a magnetic disk or solid-state non-volatile memory or volatile medium such as RAM. The instructions stored on the computer readable medium 204 may include machine readable instructions executed by the processor(s) 201 to perform the methods and functions of the system 100.

The system 100 may be implemented as software stored on a non-transitory computer readable medium and executed by one or more processors. For example, during runtime, the computer readable medium 204 may store an operating system 205, such as MAC OS, MS WINDOWS, UNIX, or LINUX, and code for the system 100. The operating system 205 may be multi-user, multiprocessing, multitasking, multithreading, real time and the like.

The computer system 200 may include a data storage 207, which may include non-volatile data storage. The data storage 207 stores any data used by the system 100. The data storage 207 may be used for one or more of the data stores shown in FIG. 1.

The network interface 203 connects the computer system 200 to internal systems for example, via a LAN. Also, the network interface 203 may connect the computer system 200 to the Internet. For example, the computer system 200 may connect to web browsers and other external applications via the network interface 203 and the Internet.

Figure 3:
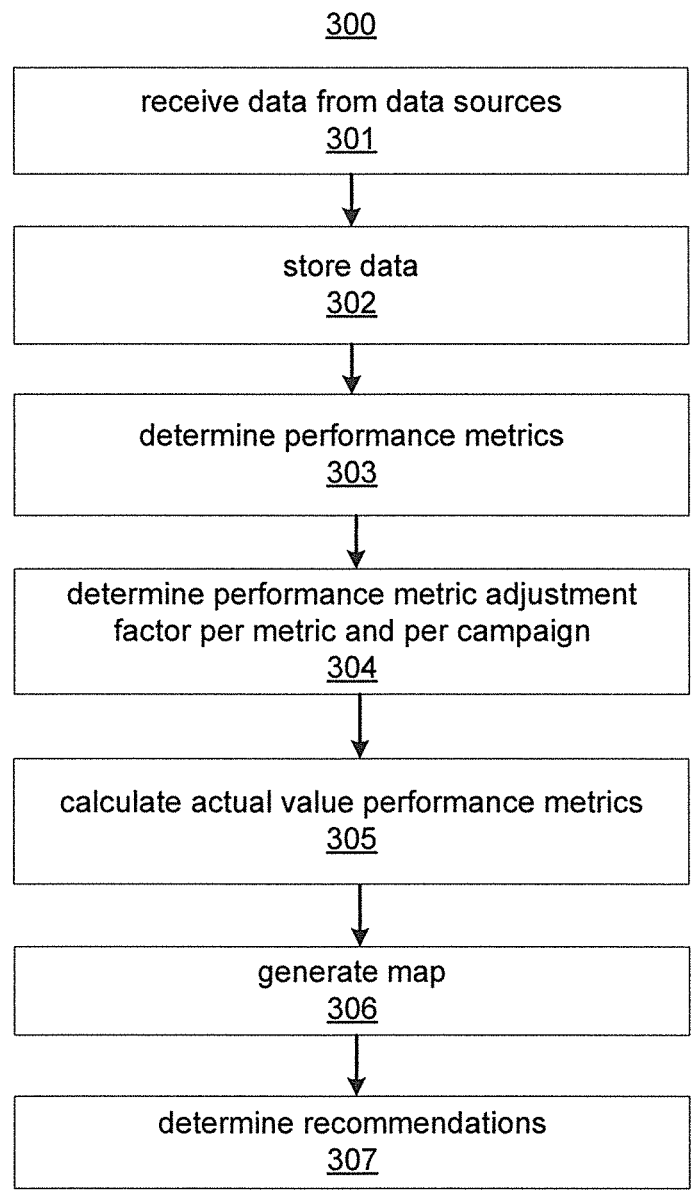
FIG. 3 illustrates a method that may be performed by the campaign management system.

FIG. 3 illustrates a method 300 according to an embodiment. The method 300 may be performed by the system 100. At 301, data is received from the data sources 130. The data may include information describing activities from different marketing channels, such as social media, online ads, email, etc. The data may include performance metrics, user information if available and time and date information for the activities. At 302, the data is stored at the data store 140.

At 303, performance metrics to be shown on the map are determined. A user may select the performance metrics. The performance metrics may be determined from the data received at 301. For example, the data collection subsystem queries the data store 140 for the performance metrics for a marketing channel. The performance metrics that are available based on information provided by the data sources 130 may be displayed to a user and the user may select one or more performance metrics for each marketing channel. The performance metric determination module 123 may receive the user selections for performance metrics for the marketing channels and assign the selected performance metrics to endpoint nodes in the map 150 that represent marketing channels. Assigning performance metrics to endpoint nodes in the map 150 may include setting flags for example in the data store 141 that the performance metrics are assigned to a particular node and when the map generator 121 displays the map, the values for the performance metrics for each endpoint node are retrieved from the data store 141 and displayed in the user interface 135. Values for the performance metrics may be stored in the data store 141 and retrieved and displayed in the map 150. For example, a performance metric for one or more marketing channels may be click throughs, and the actual value may be the measured number of click throughs on an online ad or a web page or a measured click through rate.

In one example, the objective is to enable the map 150 to indicate the health in terms of the goal or goals of the marketing campaign, and the performance metrics enable evaluating any particular aspect of the marketing campaign's health. The challenge is that the various aspects may not be directly comparable. For example: is 1000 FACE- BOOK likes good or bad; and is 100 YOUTUBE watches more or less effective than 1000 FACEBOOK likes. The answer to this depends on the goals of the marketing campaign, and therefore may vary from map to map that show the health of different goals.

There are many different metrics that could be shown on the map 150. Some examples may include FACEBOOK likes/friends, YOUTUBE views/subscriptions, LINKEDIN network statistics, website clicks, average basket value, website registrations, conversion effectiveness, number of registrations, number of downloads, click-through rates, etc. To enable comparison between these performance metrics, configurable parameters may be set for each metric. For example, each metric is represented by an individual node on the map 150 and is configured appropriately to the goal of the campaign. Configuration specifies a minimum and maximum threshold for the metric range and proportional adjustment of the ratios that correspond to red/amber/green may be set using adjustment sliders. The value of the metric (e.g., FACEBOOK likes) is compared against the ratio to determine if it is red/amber/green. Table 1 shows an example of ratios and values (e.g., number of likes) for red, amber and green for FACEBOOK likes. In this example, the minimum and maximum values are 0 and 1000 respectively. The ratios are shown in table 1.

TABLE 1

| Color | Ratio | Number of Likes |
|---|---|---|
| Red | 0-25% | 0-250 |
| Amber | 26%-75% | 251-750 |
| Green | 76%-100% | 751-1000 |

The ratios and minimum and maximum values are parameters that may be adjusted and saved for each goal and for each performance metric. Converting each performance metric to red, green or amber according to minimum and maximum values and the ratios is an example of adjustment factors referred to at 304 and determine actual values at 305 described below. Once each performance metric is measured, such as determining whether it is red, amber or green, then the performance metrics may be compared because to see how many are red, how many are amber and how many are green to determine the health of the campaign in terms of its goals. For example, if 20% of all the performance metrics are red, the overall health of the campaign may be red. In another example, if 40-60% of all the performance metrics are amber then the overall health of the campaign may be amber, or if 51% are green and less than 10% are red, then the overall health of the campaign may be green. Metrics may be weighted based on their relevance to the goal.

At 304, a performance metric adjustment factor is determined for each performance metric from 303 and an actual value performance metric is determined based on the factor at 305. The performance metric adjustment factors may be specific to a particular marketing campaign. Each performance metric adjustment factor is used to calculate the actual value performance metric. In a simple example, the performance metric adjustment factor is a weighting multiplied by its corresponding performance metric to calculate the actual value performance metric.

At 306, the map, such as the map 150, includes visual representations of the data sources 130, performance metrics and actual value performance metrics and benchmark comparisons.

At 307, if unsatisfactory performance for data sources/marketing channels are indicated on the map, recommendations may be determined to improve their performance. This may include modifying user experience through modifications to ads, web sites, etc. These modifications may be determined through the online testing and modification system 104.

Figure 4:
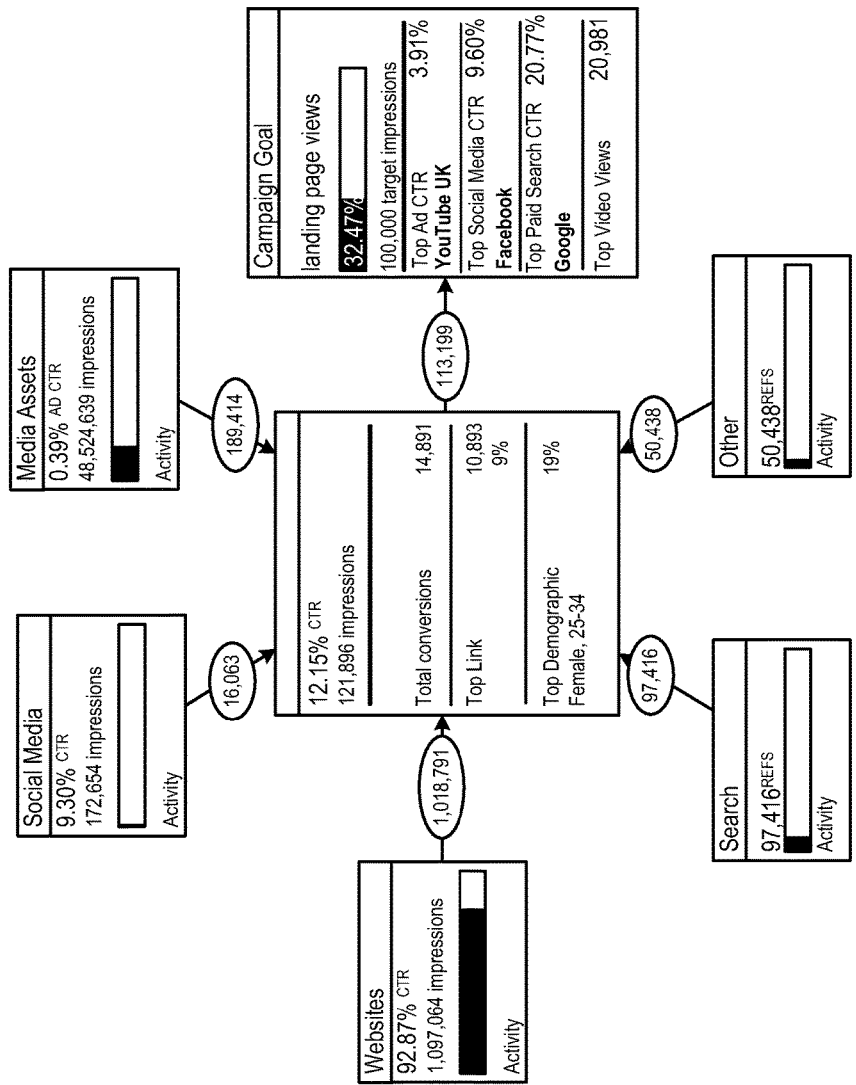
FIGS. 4-6 illustrate screenshots of a marketing campaign map.

FIG. 4 shows an example of map that may be generated by the system 100. The map allows a campaign manager to see the effect that the different marketing channels have one their marketing campaign. The map includes endpoint nodes representing the data sources 130 and shows data flow from the endpoint nodes to the target node. The data flow represents the contribution of each marketing channel to a measured performance of the marketing campaign. The data flow may represent impressions generated from each marketing channel to contribute to a goal of the marketing campaign. In the example shown, the endpoint nodes are for media assets, social media, websites, search and other. The target node in this example is a landing web page that the marketing manager wants traffic driven to. In another example, the target node may represent a FACEBOOK page for a product, or a TWITTER account for which the manager is trying to increase the number of followers.

Metrics are shown for the target webpage that describe totals based on the information and traffic from the endpoints. For example, total conversions are shown. Also, the top link directing traffic to the target node may be shown along with the top demographic.

To the right of the target node is the campaign goals node. The first metric, which is shown as target impressions, 32.47%, in red, may be an actual value performance metric for the campaign. Impressions may be driven by the number of people that clicked on a link to get to the webpage. Impression may be a measure of effectiveness to encourage people to click a link or perform some activity. Activities of users may be a click through for a paid search or a natural search or for an email ad or for an ad on a web page. Information for the activities may be stored, such as user information for the users and time the activities were performed and an indication of the activity. Also, click through rates are shown for various endpoints, which is their contribution for a total click through rate for the target node. In this example, 32.47% is the percentage of the goal currently attained, such as 32.47% of a 100,000 impressions.

In this example, the target node includes a target performance metric node which shows a target performance metric node including a total for click through rate from multiple endpoint nodes. Also shown is a target campaign goal node showing the campaign goal of a target number of impressions achieved by the marketing channels and a percentage of the target currently achieved.

FIG. 5 shows drill downs for the social media and media assets nodes. For example, the social media endpoint node may be selected to identify the social media applications under this node. For example, the social media applications include FACEBOOK and YOUTUBE and their performance metrics are shown. Also, the circle in the arrow represents the traffic from the social media endpoint to the target node. The circle may be clicked to indicate the traffic from each social media application. Media assets may be selected to show the sources under this node. Media assets may include digital assets, e.g., video, photographs, etc., created for marketing and delivered to users via email or other communication mediums.

User demographic information may be shown for a performance metric. Other examples of metrics, for example, for YOUTUBE include subscriber count and the number of people that have comments. Sentiment may be used as a metric for comments. Different metrics and/or the same metrics may be used for different endpoints. Each node may include settings that can be configured by a user to show desired metrics. Also, the performance metric adjustment factor for each node may be viewed and adjusted in the settings by a user.

FIG. 6 shows a drill down for the search endpoint, which is comprised of paid search and natural search. Paid search shows the CTR metric (click through rate) and natural search shows references as the metric.

Color coding is used to quickly show what endpoints are underperforming (red), potentially underperforming (amber) or are satisfactory (green), which may be based on thresholds. Also, the system 100 provides real-time updating of the map and the map refreshes in responses to updates.

One or more of the steps of the methods described herein and other steps described herein and one or more of the components of the systems described herein may be implemented as computer code stored on a computer readable medium, such as the memory and/or secondary storage, and executed on a computer system, for example, by a processor, application-specific integrated circuit (ASIC), or other controller. The code may exist as software program(s) comprised of program instructions in source code, object code, executable code or other formats. Examples of computer readable medium include conventional computer system RAM (random access memory), ROM (read only memory), EPROM (erasable, programmable ROM), EEPROM (electrically erasable, programmable ROM), hard drives, and flash memory.

While the embodiments have been described with reference to examples, those skilled in the art will be able to make various modifications to the described embodiments without departing from the scope of the claimed embodiments. For example, the system 100 may be used to display information for management of information other than a marketing campaign, such as information for project management including project goals.

What is claimed is:

1. An online campaign management system comprising:
   at least one processor;
   at least one data storage device to store machine readable instructions;
   a data collection subsystem to receive data for a plurality of different online marketing channels for a marketing campaign from a plurality of data sources and store the data in a data store, each of the plurality of online marketing channels being a different medium for distribution of communications, wherein at least one of the different online marketing channels comprises an Internet marketing channel;
   a map generation subsystem comprising:
      performance metric determination machine readable instructions executable by the at least one processor to determine performance metrics for the plurality of different online marketing channels from the data for the plurality of different online marketing channels and calculate a value for each of the performance metrics for a marketing campaign map;
      a low-latency data store to store the values for the performance metrics;
      threshold determination machine readable instructions executable by the at least one processor to calculate a plurality of thresholds based on stored historical performance of the plurality of different online marketing channels, and compare the values for the performance metrics to the plurality of thresholds to determine whether the performance metrics are underperforming, potentially underperforming, or are satisfactory and store an indication of whether each of the performance metrics is underperforming, potentially underperforming or satisfactory based on the comparisons; and
   map generator machine readable instructions executable by the at least one processor to generate the marketing campaign map in a single screen of a graphical user interface, the marketing map comprising:
      a plurality of nodes connected by links, the plurality of nodes including endpoint nodes and a target node representing a goal for the marketing campaign, each of the endpoint nodes representing a respective different online marketing channel of the plurality of different online marketing channels, including at least one of a social media marketing channel, a website marketing channel, a search marketing channel including paid search, a natural search marketing channel, and a media asset marketing channel and providing marketing information pertaining to the performance metrics for the respective different online marketing channel; and
      a data flow for each endpoint node, shown on a link of the plurality of links connecting the endpoint node to the target node, wherein each data flow shows a contribution of the respective marketing channel for the endpoint node to the goal, and the contribution is determined from the performance metric for the respective marketing channel,
   wherein the at least one processor executing the performance metric determination machine readable instructions is to determine metrics associated with the goal from the performance metrics, and to determine a total based on the contributions of the data flows, and
   wherein the at least one processor executing the map generator machine readable instructions is to:
      display the metrics associated with the goal and the total with the target node in the marketing campaign map, and
      update the marketing campaign map, including each data flow, to show the metrics associated with the goal, and the total, in real time based on recent values for the performance metrics retrieved from the low-latency data store; and
   an online modification module, comprising machine readable instructions executed by the at least one processor, to:
      determine whether an online marketing channel of the plurality of online marketing channels that is associated with a website is performing unsatisfactorily based on the comparison of the value of the performance metric for the online marketing channel to its respective threshold; and
      responsive to determining the online marketing channel associated with the website is performing unsatisfactorily, connect with an online testing and modification system to provide data associated with the online marketing channel that is performing unsatisfactorily to the online testing and modification system, wherein the online testing and modification system automatically optimizes the web experience for a particular user based on the data associated with the online marketing channel that is performing unsatisfactorily, wherein the optimizing comprises modifying the website.

2. The campaign management system of claim 1, comprising:
drill down machine readable instructions to cause the at least one processor to receive a selection of a drill down for one of the endpoint nodes, determine the value for the performance metric for the endpoint node for which the drill down is selected, and display the value adjacent to the selected endpoint node in the marketing campaign map.

3. The campaign management system of claim 1, wherein the endpoint nodes include a social media marketing channel, a website marketing channel, a search marketing channel including paid search, a natural search marketing channel, and a media asset marketing channel.

4. The campaign management system of claim 1, wherein the metrics associated with the goal includes at least of one click through rate and conversions.

5. The campaign management system of claim 1, wherein the goal includes a number of target impressions measuring effectiveness of the plurality of different online marketing channels driving traffic to a website, a social media web page, or a social media account.

6. The campaign management system of claim 1, wherein the data received by the data collection subsystem includes activities of users associated with the different online marketing channels, user information for the users, and time the activities were performed.

7. The campaign management system of claim 1, wherein the performance metric determination machine readable instructions are to cause the at least one processor to determine a performance metric adjustment factor for each of the performance metrics and calculate the value for each performance metric based on the performance metric adjustment factor.

8. The campaign management system of claim 7, wherein each performance metric adjustment factor comprises a weighting based on importance of the corresponding different online marketing channel.

9. The campaign management system of claim 1, wherein the performance metrics for at least some of the different online marketing channels include the same performance metric, and the map generator is to aggregate values for the same performance metric for the at some of the marketing channels and compare the aggregated values to benchmarks to generate a visual representation of the at least some different online marketing channels in the marketing campaign map.

10. A method of generating a marketing campaign map comprising:
receiving data for a plurality of different online marketing channels for a marketing campaign from a plurality of data sources and storing, by a processor, the data in a data store, each of the plurality of different online marketing channels being a different medium for distribution of communications, wherein at least one of the different online marketing channels comprises an Internet marketing channel;
determining, by the processor, performance metrics for the plurality of different online marketing channels from the data for the plurality of different online marketing channels;
calculating, by the processor, values for the performance metrics for a marketing campaign map;
storing the values for the performance metrics in a low-latency data store;
calculating a plurality of thresholds based on stored historical performance of the plurality of different online marketing channels;
comparing, by the processor, the value for each of the performance metrics for the plurality of different online marketing channels to the plurality of thresholds to determine whether the performance metrics are underperforming, potentially underperforming or are satisfactory;
storing, by the processor, an indication of whether each of the performance metrics is underperforming, potentially underperforming or satisfactory based on the comparisons; and
generating, by the processor, the marketing campaign map in a single screen of a graphical user interface, the marketing campaign map comprising:
a plurality of nodes connected by links, the plurality of nodes including endpoint nodes and a target node representing a goal for the marketing campaign, each of the endpoint nodes representing a respective different online marketing channel of the plurality of different online marketing channels, including at least one of a social media marketing channel, a website marketing channel, a search marketing channel including paid search, a natural search marketing channel, and a media asset marketing channel, and providing marketing information pertaining to the performance metrics for the respective different online marketing channel; and
a data flow for each endpoint node, shown on a link of the plurality of links connecting the endpoint node to the target node, wherein each data flow shows a contribution of the respective marketing channel for the endpoint node to the goal, and the contribution is determined from the performance metric for the respective marketing channel;
determining, by the processor, metrics associated with the goal from the performance metrics, and determining a total based on the contributions of the data flows;
displaying the metrics associated with the goal and the total with the target node in the marketing campaign map;
updating the marketing campaign map, including each data flow, to show the metrics associated with the goal, and the total, in real time based on recent values for the performance metrics retrieved from the low-latency data store;
determining whether an online marketing channel of the plurality of online marketing channels that is associated with a website is performing unsatisfactorily based on the comparison of the value of the performance metric for the online marketing channel to its respective threshold; and
responsive to determining the online marketing channel associated with the website is performing unsatisfactorily, connecting with an online testing and modification system to transmit data associated with the online marketing channel that is performing unsatisfactorily to the online testing and modification system,
wherein the online testing and modification system automatically optimizes the web experience for a particular user based on the data associated with the online marketing channel that is performing unsatisfactorily, wherein the optimizing comprises modifying the website.

11. The method of claim 10, comprising:
receiving, by the processor, a selection of a drill down for one of the endpoint nodes; and
determining, by the processor, the value for the performance metric for the endpoint node for which the drill down is selected; displaying the value adjacent to the selected endpoint node in the marketing campaign map.

12. The method of claim 10, wherein the endpoint nodes include a social media marketing channel, a website marketing channel, a search marketing channel including paid search, a natural search marketing channel, and a media asset marketing channel.

13. The method of claim 10, comprising:
determining, by the processor, a performance metric adjustment factor for each of the performance metrics; and
calculating, by the processor, the value for each performance metric based on the performance metric adjustment factor.

14. The method of claim 13, wherein each performance metric adjustment factor comprises a weighting based on importance of a corresponding different online marketing channel, and the calculating of the actual value for each performance metric comprises multiplying the weight for each performance metric with the value for the performance metric.

15. A non-transitory computer readable medium including machine readable instructions executable by at least one processor to:
receive data for a plurality of different online marketing channels for a marketing campaign from a plurality of data sources and storing the data in a data store, each of the plurality of different online marketing channels being a different medium for distribution of communications, wherein at least one of the different online marketing channels comprises an Internet marketing channel;
determine performance metrics for the plurality of different online marketing channels from the data for the plurality of different online marketing channels;
calculate values for the performance metrics for a marketing campaign map;
store the values for the performance metrics in a low-latency data store;
calculate a plurality of thresholds based on stored historical performance of the plurality of different online marketing channels;
compare the value for each of the performance metrics for the plurality of different online marketing channels to the plurality of thresholds to determine whether the performance metrics are underperforming, potentially underperforming or are satisfactory;
store an indication of whether each of the performance metrics is underperforming, potentially underperforming or satisfactory based on the comparisons; and
generate the marketing campaign map in a single screen of a graphical user interface, the marketing map comprising:
a plurality of nodes connected by links, the plurality of nodes including endpoint nodes and a target node representing a goal for the marketing campaign, each of the endpoint nodes representing a respective different online marketing channel of the plurality of different online marketing channels, including at least one of a social media marketing channel, a website marketing channel, a search marketing channel including paid search, a natural search marketing channel, and a media asset marketing channel, and providing marketing information pertaining to the performance metrics for the respective different online marketing channel, and
a data flow for each endpoint node, shown on a link of the plurality of links connecting the endpoint node to the target node, wherein each data flow shows a contribution of the respective marketing channel for the endpoint node to the goal, and the contribution is determined from the performance metric for the respective marketing channel,
determine metrics associated with the goal from the performance metrics, and determining a total based on the contributions of the data flows;
display the metrics associated with the goal and the total with the target node in the marketing campaign map;
update the marketing campaign map, including each data flow, the metrics associated with the goal, and the total, in real time based on recent values for the performance metrics retrieved from the low-latency data store;
determine whether an online marketing channel of the plurality of online marketing channels that is associated with a website is performing unsatisfactorily based on the comparison of the value of the performance metric for the online marketing channel to its respective threshold; and
responsive to determining the online marketing channel associated with the website is performing unsatisfactorily, connect with an online testing and modification system to transmit data associated with the online marketing channel that is performing unsatisfactorily to the online testing and modification system,
wherein the online testing and modification system automatically optimizes the web experience for a particular user based on the data associated with the online marketing channel that is performing unsatisfactorily, wherein the optimizing comprises modifying the website.

* * * * *